United States Patent [19]

Gessford

[11] 4,232,658
[45] Nov. 11, 1980

[54] SOLAR COLLECTOR PANEL

[76] Inventor: James D. Gessford, 20 S. First East, P.O. Box 87, Bancroft, Id. 83217

[21] Appl. No.: 858,584

[22] Filed: Dec. 8, 1977

[51] Int. Cl.$^3$ ............................................. F24J 3/02
[52] U.S. Cl. ................................. 126/441; 126/447; 126/449; 126/450; 428/116; 428/188; 156/210; 156/292; 156/306.9
[58] Field of Search ............... 126/270, 271, 447, 448, 126/449, 450, 416, 441; 237/1 A; 156/309; 428/73, 116–118

[56] References Cited

U.S. PATENT DOCUMENTS

| | | | |
|---|---|---|---|
| 2,477,852 | 8/1949 | Bacon | 428/116 |
| 2,501,180 | 3/1950 | Kunz | 428/116 |
| 2,608,500 | 8/1952 | Del Mar et al. | 428/118 |
| 3,018,087 | 1/1962 | Steele | 126/271 X |
| 3,103,460 | 9/1963 | Picket | 428/118 |
| 3,145,707 | 8/1964 | Thomason | 126/271 |
| 3,152,260 | 10/1964 | Cummings | 126/270 X |
| 3,194,228 | 7/1965 | Bargues | 126/271 |
| 3,450,593 | 6/1969 | Fossier et al. | 428/73 |
| 3,513,828 | 5/1970 | Masters | 126/271 |
| 3,615,963 | 10/1971 | Johansson | 156/62.2 |
| 3,918,430 | 11/1975 | Stout et al. | 126/271 |
| 3,946,720 | 3/1976 | Keyes et al. | 126/270 |
| 3,980,071 | 9/1976 | Barber, Jr. | 126/271 |
| 3,996,092 | 12/1976 | Sarazin et al. | 237/1 A |
| 4,055,163 | 10/1977 | Costello et al. | 126/450 |
| 4,062,352 | 12/1977 | Lesk | 126/271 |
| 4,085,999 | 4/1978 | Chahroudi | 126/270 |
| 4,092,977 | 6/1978 | Gurtler | 126/270 |
| 4,114,599 | 9/1978 | Stephens | 126/271 |
| 4,146,012 | 3/1979 | Elkins et al. | 126/444 |
| 4,151,830 | 5/1979 | Crombie et al. | 126/444 |

OTHER PUBLICATIONS

Direct Use of The Sun's Energy, Daniels, Ballantine Books, pp. 37–42, 1974.
Applied Solar Energy, Meinel and Meinel, Addison Wesely Publishing Company, Inc., 1976.

*Primary Examiner*—James C. Yeung
*Assistant Examiner*—Larry Jones
*Attorney, Agent, or Firm*—H. Ross Workman; J. Winslow Young; Rick D. Nydegger

[57] ABSTRACT

A solar collector panel and method of making same are disclosed. The solar collector panel has four layers of fiberglass mat which are each saturated with a catalyzed liquiform resin. Between the first two layers, unimpregnated Kraft honeycomb paper having an open cellular structure is placed so as to form a resinated honeycomb core between these first two layers. A black gel coat is sprayed onto the second layer of resin-saturated fiberglass mat and a plurality of copper tubes are then placed onto the black gel coat so as to be bonded in heat-transfer relation thereto. The third layer of resin-saturated fiberglass mat is draped over the copper tubes so as to insulate them. A second layer of Kraft honeycomb paper is then placed between the third and forth layers of resin-saturated fiberglass mat, and a clear gel coat mixed with an ultraviolet inhibitor solution is rolled out over the top of the solar collector panel to partially screen out ultraviolet rays.

7 Claims, 5 Drawing Figures

SOLAR COLLECTOR PANEL

BACKGROUND

1. Field of the Invention

This invention relates to solar energy collector systems, and more particularly to structure and method for a flat-plate solar energy collector panel which may be used for providing all or some of the energy needs in homes, buildings and other structures.

2. The Prior Art

As is well known, recent increases in the cost of energy for heating have resulted in renewed interest in the collection and utilization of solar energy. In response to this renewed interest, a plethora of solar energy collecting devices has recently been developed. These devices range from those which are very simple in construction, such as for example the placement of large, flat rows of black plastic tubing on a roof so as to absorb solar energy as water is directed through the tubing, to those devices which are highly complicated, such as solar collectors which are designed to automatically track the sun's position on a daily and/or seasonal basis. See generally the comprehensive review of methods for utilizing solar energy written by Dr. Farrington Daniels in his book *Direct Use of the Sun's Energy*, published by Ballentine Books, 1977. See also *Applied Solar Energy*, by Aden B. Meinel and Marjorie P. Meinel, published by Addison-Wesley Publishing Company, 1976.

Despite the wide variety of flat-plate solar collecting devices now available, extensive use of such solar collectors has not yet found its way into either the private housing industry or the area of application for small office buildings and the like. It is believed that several reasons account for this lack of acceptance of solar collectors by the general public. For example, many flat-plate solar collector devices lack the aesthetic appearances which are desired by private homeowners. Other flat-plate solar collector devices are so complicated in their structure and operation that the cost and time involved in installing and maintaining such devices in private homes and small business offices is prohibitive. Yet another barrier is presented by the fact that most flat-plate solar collector devices are not efficient enough in terms of collecting and retaining solar energy to be able to continue providing heat output in the absence of prolonged exposure to the sun's rays. Although this latter problem can be somewhat overcome through the utilization of an appropriate heat storage system, such as an insulated hot water tank or an insulated rock pit, it has nevertheless been found that most such solar collector devices rapidly lose their ability to transfer heat to the heat storage system during periods of cloudiness or in the absence of prolonged exposure to the sun's rays.

Accordingly, in an attempt to encourage a more widespread use of flat-plate solar collector panels throughout the private housing industry and for small office buildings and the like, the solar collector panel of the present invention has been designed to minimize and avoid the aforementioned problems.

BRIEF SUMMARY AND OBJECTS OF THE INVENTION

The present invention has been designed and constructed from relatively inexpensive materials so that the cost of the solar collector panel is much more competitive than other flat-plate collectors with the cost for conventional building materials currently in use for roof coverings on houses and the like. Furthermore, the solar collector panel of the present invention is simple in design and is very strong and durable. It can be used directly as the covering for the roof of a house or small office building. The rigidity and strength of the solar collector panel of the present invention is derived at least in part from the use of a resinated honeycomb core of Kraft paper which is interposed between two layers of chopped fiberglass mat which are saturated with a catalyzed liquiform resin. A variety of colors can be achieved so as to make the solar collector panel aesthetically acceptable by dyeing the first layer of honeycomb. Furthermore, the novel combination of structure and materials used in the present invention has resulted in a flat-plate collector which has a surprisingly high efficiency in terms of collecting solar energy and transferring it in the form of heat energy. It has been found that the solar energy collector of the present invention will continue to transfer heat to the heat storage system even over extended periods of time in which the solar collector panel is not directly exposed to the sun's rays.

It is, therefore, a primary object of the present invention to provide an improved solar energy collector panel.

Another object of this invention is to provide a novel combination of structure and materials for a solar energy collector panel so as to provide more efficient absorption of solar energy and transfer of heat energy to a heat storage medium over relatively longer periods of time, even in the absence of direct exposure to the sun's rays.

It is another object of the present invention to provide a solar collector panel which may be inexpensively fabricated and which is sufficiently strong and durable to permit direct use of the collector as the roof covering for homes and other buildings.

Another object of the present invention is to provide an inexpensive and efficient method for fabricating an improved solar collector panel so that its cost is competitive with that of other conventional roof coverings.

Yet another object of the present invention is to provide a method of fabrication for a solar collector panel whereby the solar collector panel will have improved rigidity and strength which enable its use as a roof covering.

These and other objects of the present invention will become more fully apparent from the following description and appended claims taken in conjunction with the accompanying drawing.

DETAILED DESCRIPTION OF THE PREFERRED EMBODIMENTS

Figure 1:
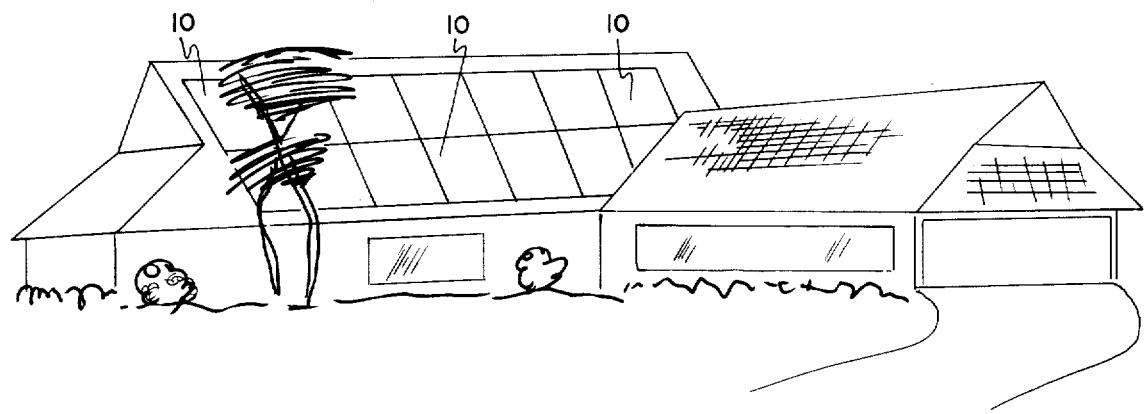
FIG. 1 is a perspective view of a dwelling having a roof constructed from the solar energy panel of the present invention.

The invention is best understood by reference to the drawing wherein like parts are designated with like numerals throughout.

Referring first to FIG. 1, it will be seen that the solar collector panels generally designated 10 of the present invention are designed to be used as a roof covering for dwelling places and other small buildings. Although each panel 10 may be constructed in any desired size, it has been found in practice that four feet by ten feet (1.22 meters by 3.05 meters) is a convenient size and permits the panels to be easily attached between the trusses on most conventional roofs for dwelling houses and the like. Furthermore, it has been found that a desirable thickness for each panel is approximately 1⅜ inches (3.49 centimeters). As will be hereinafter more fully described, each solar collector panel 10 is constructed in a unique manner which enhances the structural rigidity of the panel 10 so that it may be used directly as the roof cover.

Figure 2:
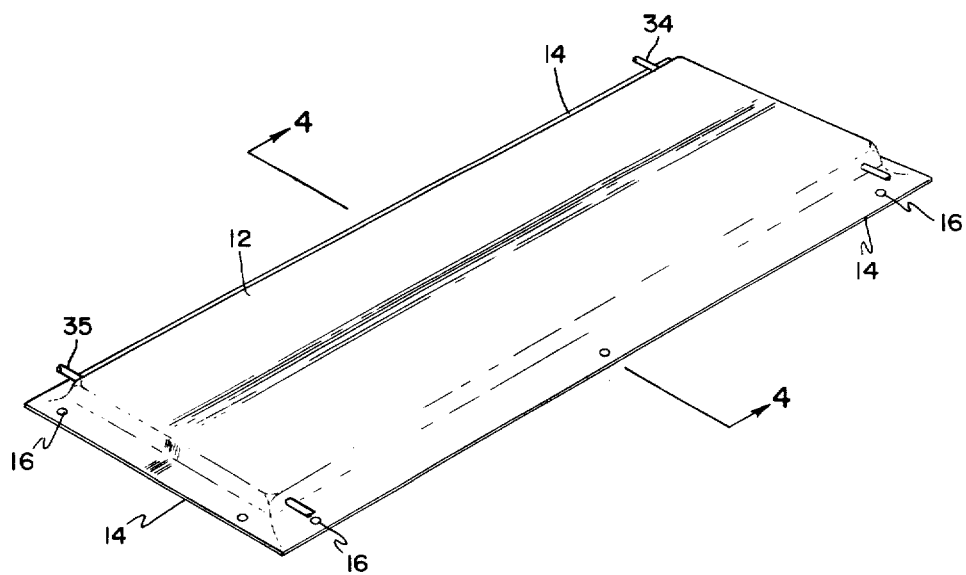
FIG. 2 is a perspective view illustrating the underside of one presently preferred embodiment of the solar energy collector panel of the present invention.

As shown best in FIG. 2, each panel 10 is entirely enclosed. The exterior surfaces of panel 10 are made from fiberglass coated with a thin layer of gel coat, described below. The portion of the panel 10 which is utilized for collection of solar energy and transfer of heat to a heat storage medium is contained primarily within the raised portion 12 of panel 10 as will hereinafter be more fully described. A flange 14 extends around the periphery of the panel 10 and is provided with holes 16 through which the panel 10 may be nailed or screwed to the trusses of the roof.

Figure 3:
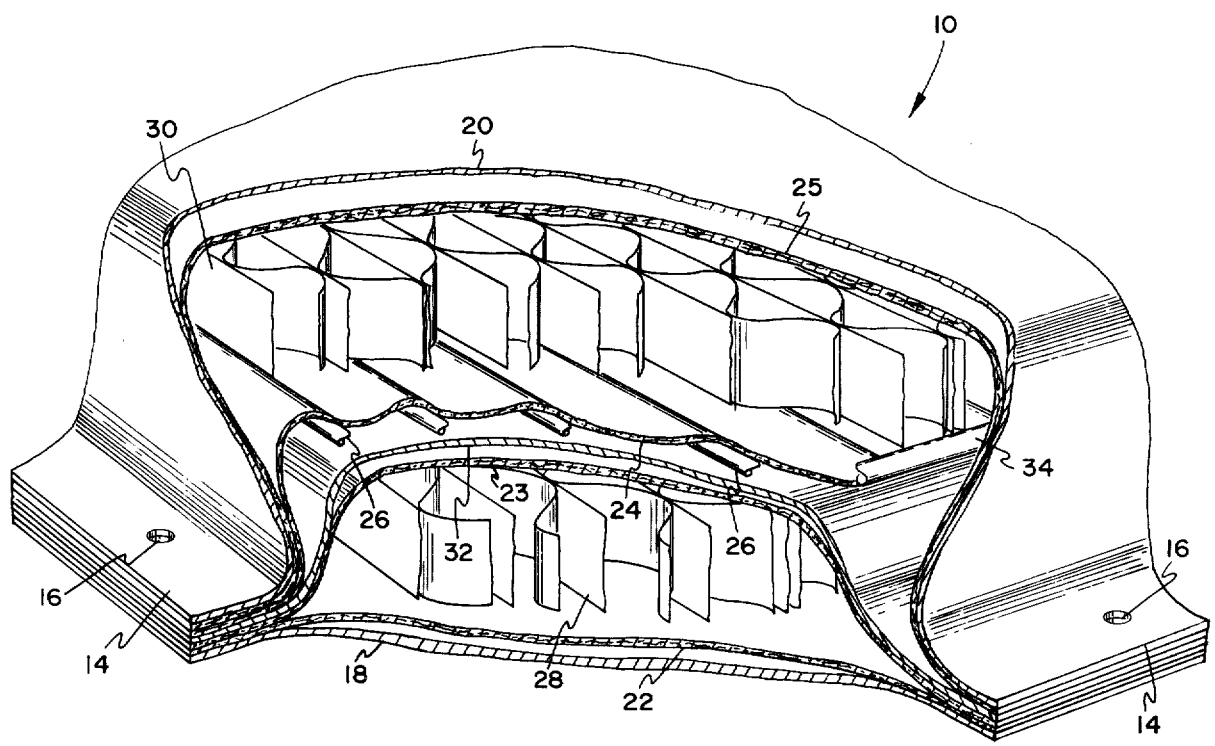
FIG. 3 is a fragmentary perspective view of the solar energy collector panel of FIG. 2 with portions broken away to reveal the construction of the panel.
Figure 4:
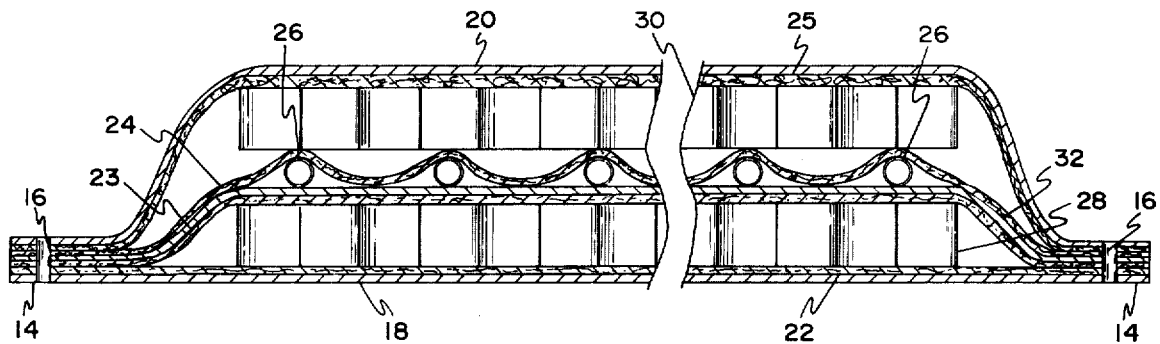
FIG. 4 is a cross-section of the solar collector panel taken along lines 4—4 of FIG. 2.

FIGS. 3 and 4 illustrate the internal construction of the solar collector panel 10. As shown in these figures, layers 18 and 20, which form the external surfaces for the panel 10, are made from a material such as a gel coat. Any suitable gel coat could be used for layers 18 and 20, as for example that manufactured by Ram Chemical Company and sold under the name Crystal Clear Gel Coat. Layer 18, which is the surface exposed to the sun's rays, additionally has an ultraviolet inhibitor added to the gel coat which prevents degradation of other polyester resinous materials contained within the solar collector panel 10 described below. The ultraviolet inhibitor is commercially available, and is made by Sherwin Williams Company, Product No. V66-V-Y64. In practice, it has been found desirable to add 2.12 quarts (2.01 liters) of ultraviolet inhibitor solution to each 500 pound (227 kgm.) drum of clear gel coat. The ultraviolet inhibitor solution should be added just prior to application of the gel coat.

Each of the layers 22 through 25 is made from a layer of chopped fiberglass mat saturated in a mixture of catalyzed resin. Although various weights of fiberglass may be used in order to achieve differing characteristics with respect to strength and rigidity, in practice it has been found desirable to use chopped fiberglass mat which weighs ¾ ounce per square foot (21.3 gm. per 0.093 square meters). As shown best in FIG. 4, each of the fiberglass layers 22–25 is large enough so that each of the sides of the layers 22–25 may be joined at the peripheral edges 14 of the solar collector panel 10. In this manner, as the catalyzed resin cures, peripheral edges 14 are bonded together, thus forming a completely enclosed collector panel. Furthermore, the plurality of fiberglass layers which are bonded together at the peripheral edges forms a strong surrounding flange 14 (see FIG. 2) which may be utilized in mounting the solar collector panel 10 to the trusses of the roof.

Referring again to FIG. 4, it will be seen that fiberglass layer 24 is draped over a series of copper tubes 26. For purposes to be hereinafter more fully described, by draping the fiberglass layer 24 over each of the tubes in the manner illustrated, each of the tubes may be individually insulated within an enclosed space formed by the fiberglass layer 24 and layer 32 of black gel coat.

Layers 28 and 30 are formed from an untreated Kraft paper which has a honeycomb structure. The honeycomb structured Kraft paper is available from any of a number of commercial manufacturers. As shown in FIGS. 3 and 4, honeycomb layer 28 is interposed between fiberglass layers 22 and 23. Honeycomb layer 30 is interposed between fiberglass layers 24 and 25. As will be hereinafter more fully described, honeycomb layer 28 is impregnated with resin so as to form a resinated honeycomb core sandwiched between the fiberglass layers 22 and 23. In this manner, resinated honeycomb layer 28 helps to increase the structural strength and rigidity of the solar collector panel 10. Honeycomb layers 30 and 28 are also believed to contribute to the improved efficiency of the solar collector panel, as discussed below. Furthermore, although the illustrated embodiment has been shown with two honeycomb layers, it is presently believed that one layer would also work effectively.

A thin layer 32 of black gel coat is applied to the upper surface of fiberglass layer 23. A plurality of copper tubes 26 are then bonded to this layer of gel coat in heat transfer relation. As described below, the black pigment in gel coat layer 32 serves to increase absorption of solar energy while the solid bond which is formed between copper tubes 26 and gel coat layer 32 serves to increase the rate of transfer of heat to fluids flowing through the tubes 26. As shown in FIG. 3, an inlet manifold tube 34 is connected to each of the copper tubes 26 so that fluid may be communicated to the tubes 26 through the manifold tube 34. A corresponding outlet manifold tube 35 (FIG. 5) is provided at the opposite end of tubes 36. In this manner, water or other suitable heat transfer fluid is circulated through the tubes 26 and serves as the heat storage medium in an insulated water storage tank (not shown).

Figure 5:
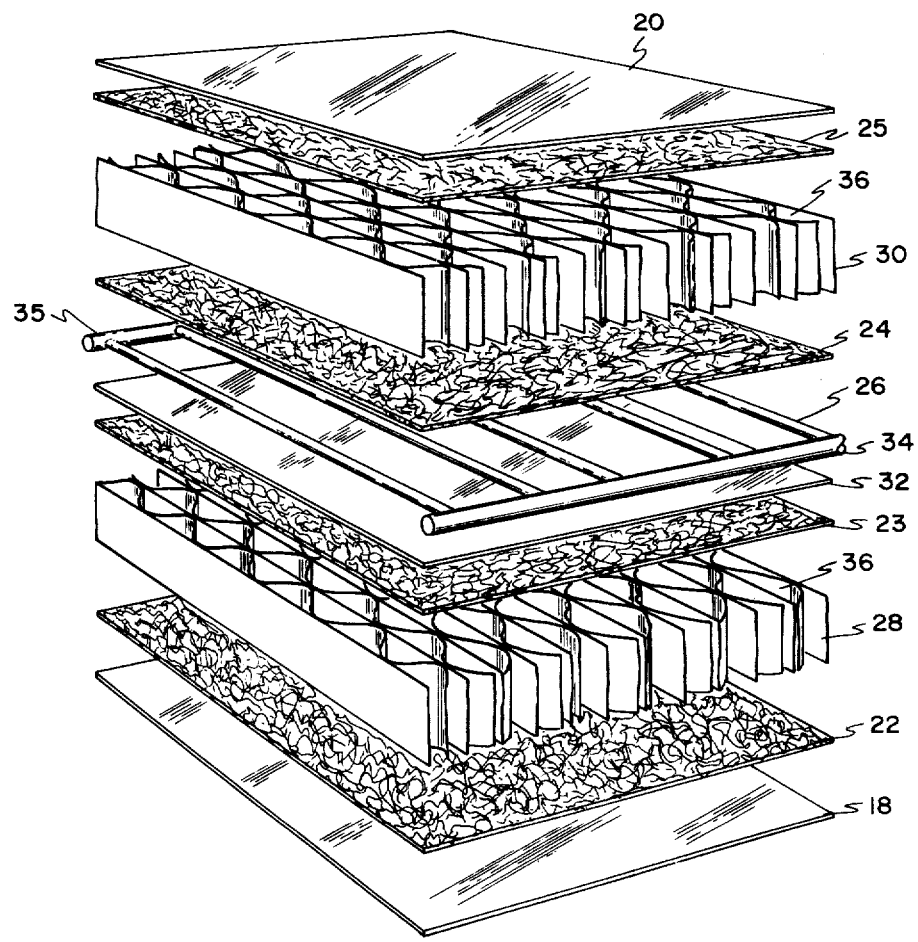
FIG. 5 is an exploded perspective view of the solar collector panel of the present invention illustrating the construction of the panel.

Reference is now made to FIG. 5 in connection with a description of the method for manufacturing the solar collector panel 10. A flat mold (not shown) is initially coated with a thin layer 18 of gel coat. As previously described, layer 18 of gel coat is mixed with a predetermined amount of ultraviolet inhibitor solution so as to prevent penetration of ultraviolet rays which would subsequently degrade the polyester resinous materials in the fiberglass layers 22–25. Layer 18 is allowed to cure and then a layer of chopped fiberglass mat saturated with catalyzed resin is rolled out over layer 18 to render it bubble free. Chopped fiberglass layer 22 is then oversprayed with catalyzed resin. The raw paper honeycomb layer 28 is next placed directly into the wet laminate formed by layer 22. The honeycomb layer 28 is then covered with a good grade of wax-type paper is weighted with sandbags to approximately 10 pounds per square foot (49 kilograms per square meter). This presses the honeycomb layer 28 into place. As the catalyzed resin cures, heat and styrene gas are given off and are entrapped by the waxpaper. This entrapped heat and liberation of gas partially reduces the viscosity of the catalyzed resin and permits it to climb the cell walls of the first honeycomb layer 28. After a sufficient period of time to permit the resin to partially cure, the sandbags and waxpaper are removed and excess styrene fumes are blown out of the individual cells of honeycomb layer 28. Honeycomb layer 28 is then given a light overspray of catalyzed resin to give a tacky surface for placement of layer 23. Layer 28 may be tinted with any of a variety of colors for purposes of achieving an aesthetically desirable color for the panel.

A second layer 23 of fiberglass mat which is saturated with a catalyzed resin is then carefully rolled into place over the upper surface of honeycomb layer 28. The second layer 23 of fiberglass mat is allowed to partially cure and is then coated with a layer 32 of black gel coat. While the layer 32 of gel coat is still wet, copper tubes 26 and intake manifold 34 and outtake manifold 35 are pressed onto the black gel coat layer 32, thus being bonded in heat transfer relation thereto.

A third layer 24 of fiberglass mat saturated with catalyzed resin is then draped over copper tubes 26 as shown best in FIG. 4. Between each of the tubes 26, the saturated fiberglass layer 24 comes into contact with the black gel coat layer 32 and is bonded thereto, thus enclosing each tube 26 individually within a small enclosed space formed between the fiberglass layer 24 and black gel coat layer 32. As hereinafter described, it is believed that this helps to insulate the tubes 26, thereby decreasing any heat loss through tubes 26.

A second unimpregnated layer of craft honeycomb paper 30 is next placed on top of the fiberglass layer 24. Layer 25 of fiberglass is then rolled out over the top of honeycomb layer 30 and is given an overspray of catalyzed resin in the same manner as described previously. Layer 25 is allowed to partially cure and is then covered with a thin layer 20 of colored gel coat.

Significantly, by using the first honeycomb layer 28 as a wick to pull resin into the cell structure of the layer 28, surprising strength and rigidity is imparted to the solar collector panel 10. This strength and rigidity permits the collector panel 10 to be used directly as the covering for a roof without any auxiliary structure. Furthermore, the materials used in collector panel 10 are relatively inexpensive and therefore the solar collector panel 10 can be made and sold at a cost which is much more competitive than most other flat-plate collectors with the cost of conventional roof coverings.

The solar collector panel 10 is operated by being first mounted at an optimal angle of incidence to the sun's rays. This angle may vary depending on different geographic regions of the country. Light is then admitted through layers 18 and 22, with ultraviolet light being at least partially screened out by the ultraviolet inhibitor mixed into layer 18. The sunlight is reflected through the individual cells of honeycomb layer 28 and is then absorbed in layers 23 and 32. The black pigment in layer 32 helps to increase the absorption. As the solar energy is absorbed by layers 23 and 32, the temperature of layers 23 and 32 increases to the point where transfer of heat energy through copper tubes 26 to the liquid (not shown) passing through tubes 26 begins to occur.

In addition to the strength and durability of the solar collector panel 10 of the present invention, actual tests of the solar collector panel have indicated a surprisingly high degree of efficiency in terms of collecting solar energy and transferring it in the form of heat energy to a heat storage medium such as water or other liquid passing through the tubes 26. Although it is not known for certain why the solar collector panel of the present invention has demonstrated such a surprisingly high efficiency, it is presently believed that both the structure and the particular types of materials used in constructing the solar panel may be contributing factors to the surprisingly effective operation of the solar collector panel of the present invention.

For example, it is presently believed that during periods of cloudiness or intermittent exposure to the sun's rays, transfer of heat energy to the heat storage medium continues for relatively long periods of time because of the ability of the solar collector to more efficiently retain the collected solar energy. It is believed that the double honeycomb layers 28 and 30 help to suppress thermal infrared radiation losses from the black collector layer 32 by absorbing thermal infrared radiation in the walls of the individual cell structures. It is also believed that the honeycomb layers 28 and 30 further help to reduce loss of thermal energy by inhibiting convective losses, since the numerous individual cells prevent large air current movement. Losses are also reduced by draping layer 24 over tubes 26, as discussed previously, in order to insulate tubes 26.

In addition to the foregoing, it is also presently believed that the use of saturated fiberglass may have thermal properties which contribute at least in part to the surprising efficiency of the solar collector panel. Similarly, resin coated honeycomb layer 28, as well as honeycomb layer 30 and layer 32 may have, it is believed, thermal properties contributing to the collector's surprising efficiency.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A solar collector panel comprising:
    a first fiberglass matrix saturated with a catalyzed liquiform resin;
    a second fiberglass matrix saturated with a catalyzed liquiform resin;
    a layer of honeycomb material bonded between said first and second fiberglass matrices, said layer comprising a plurality of individual cell structures that are substantially perpendicular to the surface of one of said matrices;
    a layer of gel coat type material bonded to the surface of one of said first or second fiberglass matrices; and
    a plurality of tubes bonded in heat-transfer relation to said layer of gel coat type material.

2. A solar collector as defined in claim 1 further comprising a layer of clear gel coat bonded to at least a portion of the exterior of said solar panel, said clear gel coat comprising a substance for screening out ultraviolet rays.

3. A solar collector as defined in claim 1 further comprising:
    a third fiberglass matrix saturated with a catalyzed liquiform resin, said third fiberglass matrix enclosing said tubes so as to insulate said tubes in a plurality of air pockets;

a fourth fiberglass matrix saturated with a catalyzed liquiform resin; and a second layer of honeycomb material bonded between said third and fourth fiberglass matrices.

4. A solar collector as defined in claim 3 wherein said insulating air pockets are formed by draping said third fiberglass matrix over said tubes.

5. A solar collector panel comprising in combination:
a first fiberglass matrix saturated with a catalyzed liquiform resin;
a second fiberglass matrix saturated with a catalyzed liquiform resin;
a layer of porous honeycomb material bonded between said first and second fiberglass matrices, said layer comprising a plurality of individual cell structures wherein the walls of essentially each cell structure are substantially perpendicular to the surface of one of said matrices, are resin-saturated and are integrally bonded to at least one of said fiberglass matrices; and
a layer of gel coat type material bonded to the surface of one of said first or second matrices;
a plurality of tubes bonded in heat-transfer relation to said gel coat type material.

6. A solar collector comprising:
a first fiberglass matrix saturated with a catalyzed liquiform resin;
a layer of black gel coat type material bonded to the surface of said first fiberglass matrix;
a plurality of tubes bonded in heat-transfer relation to said layer of black gel coat type material;
a second fiberglass matrix saturated with a catalyzed liquiform resin, said second fiberglass matrix being draped over said tubes so as to form an insulating air pocket about each tube;
a third fiberglass matrix saturated with a catalyzed liquiform resin;
a layer of honeycomb material bonded between said second and third fiberglass matrices, said layer of honeycomb material comprising a plurality of individual cell structures that are substantially perpendicular to the surface of one of said matrices; and
a layer of clear gel coat type material bonded to the exterior surface of said third fiberglass matrix, said layer of clear gel coat type material comprising a substance for screening out ultraviolet rays.

7. A method of manufacturing solar collector panels, comprising the steps of:
saturating a first layer of fiberglass mat with a catalyzed liquiform resin;
placing a first layer of unimpregnated, porous material having a honeycomb structure onto said saturated first layer of fiberglass mat;
sealing said first honeycomb layer by placing a gas-impervious layer of material on top of said first honeycomb layer;
liberating styrene gas in response to said sealing step, thereby causing said resin to be at least partially drawn up into said first honeycomb layer;
removing said gas-impervious layer after said resin has at least partially cured;
saturating a second layer of fiberglass mat with catalyzed liquiform resin and placing said second layer on top of said first honeycomb layer;
bonding a plurality of tubes to the second fiberglass layer as the resin of the second fiberglass layer is cured;
saturating a third layer of fiberglass mat with catalyzed liquiform resin and draping said third layer over said tubes;
placing a second layer of honeycomb structure material on top of said third fiberglass layer; and
saturating a fourth fiberglass mat layer with catalyzed liquiform resin and placing said fourth layer on top of said second honeycomb layer, so as to form an enclosed solar collector panel.

* * * * *